United States Patent [19]

Hellkuhl et al.

[11] 4,142,349

[45] Mar. 6, 1979

[54] DISK TYPE MOWER

[75] Inventors: Ludger Hellkuhl; Martin Maier, both of Gottmadingen, Fed. Rep. of Germany

[73] Assignee: Maschinenfabrik Fahr Aktiengesellschaft Gottmadingen, Gottmadingen, Fed. Rep. of Germany

[21] Appl. No.: 771,310

[22] Filed: Feb. 23, 1977

[30] Foreign Application Priority Data

Feb. 25, 1976 [DE] Fed. Rep. of Germany ....... 2607666

[51] Int. Cl.² ............................................ A01D 49/00
[52] U.S. Cl. .................................. 56/14.4; 56/DIG. 1
[58] Field of Search .................. 56/192, DIG. 1, 14.3, 56/14.4

[56] References Cited

U.S. PATENT DOCUMENTS 3,751,889  8/1973  Overesch ................... 56/DIG. 1 X
3,820,311  6/1974  Sawyer et al. ......................... 56/14.4

FOREIGN PATENT DOCUMENTS 1239827  7/1960  France .................................. 56/DIG. 1

*Primary Examiner*—Russell R. Kinsey
*Assistant Examiner*—Daniel J. Leach
*Attorney, Agent, or Firm*—Karl F. Ross

[57] ABSTRACT

A mower with two pairs of counterrotating cutting disks has a frame on which two yokes are mounted for independent swinging about a horizontal axis transverse to the direction of travel, each yoke carrying a pair of coacting horizontal conditioning rollers which in a working position lie in the wake of a respective disk pair to gather and press the mown crop coming from these disks. The conditioning rollers are driven from a pair of ancillary shafts on the machine frame, operatively linked with the disk drive, through extensible and universally jointed transmission shafts enabling each yoke to be separately swung into a retracted position.

9 Claims, 2 Drawing Figures

DISK TYPE MOWER

FIELD OF THE INVENTION

Our present invention relates to a mower of the type wherein a wheeled frame, adapted to be towed by a tractor across a field whose crop is to be harvested, extends generally transversely to the direction of travel and carries two or more pairs of cutting disks counterrotating about generally vertical axes.

BACKGROUND OF THE INVENTION

A mower or harvesting machine of this character has been disclosed, for example, in commonly owned U.S. Pat No. 3,772,865. That patent also teaches the positioning of a deflecting drum in the wake of each disk pair for the purpose of gathering the mown crop into a windrow.

In German printed specification No. 2,023,274 and corresponding U.S. Pat. No. 3,656,284 there has been described a harvesting machine of this type in which a pair of horizontal conditioning rollers, designed to gather and press the freshly cut stalks between them, are disposed rearwardly of a set of four cutting disks and are relatively counterrotated by a single chain linked with the disk drive. The roller surfaces are helically ribbed in a manner tending to concentrate the mown crop along the centerline of the swath cut by the disk array, thus leaving a single row of grass or other stalks intended to turn into hay or silage. One problem with such a transmission is that the driving chain exerts upon the two counterrotating rollers a transverse force urging them toward or away from each other, depending upon the connection between the chain and the associated sprockets, so that it is difficult to maintain a desired pressure therebetween.

U.S. Pat. No. 3,820,311 relates to a different type of mower, using a cutter bar instead of counterrotating disks, in which a pair of conditioning rollers are driven through extensible and universally jointed shafts. The lower conditioning roller is journaled in fixed bearings on the machine frame while the upper roller is adjustable with reference thereto. Power is supplied to the roller shafts through a laterally disposed transmission housing.

The accumulation of the mown crop in a single windrow midway of the swath is sometimes disadvantageous, as when only one pair of cutting disks are used to mow the edge of a field or to cut a narrow swath for some other reason. Also, problems of alignment, oil leakage, lubrication and accessibility arise with laterally mounted transmission systems, especially in a machine using more than two pairs of cutting disks.

OBJECTS OF THE INVENTION

The general object of our present invention, therefore, is to provide a drive mechanism for the conditioning rollers of a disk mower obviating the drawbacks referred to.

A more particular object is to provide means in such a mower for allowing selective deactivation of two or more pairs of conditioning rollers associated with respective disk pairs.

SUMMARY OF THE INVENTION

We realize these objects, in accordance with our present invention, by the provision of separate supports for two pairs of conditioning rollers disposed in the wake of respective pairs of counterrotating cutting disks, each support extending rearwardly of the machine frame and being preferably provided with a pivotal mounting allowing it to be independently swung for elevating the rollers from a working position into a retracted position remote from the disk level. The roller pairs on these two supports are connected with the disk drive by way of transmission means including a power train common to both supports and a universally jointed and preferably extensible shaft individual to each roller. Such an array of two disk pairs and two roller supports can, obviously, be duplicated two or more times if there is an even number of disk pairs greater than two.

Each support may be in the shape of a yoke with two lateral arms interconnected by the two roller shafts, the axis of the lower roller shaft (as seen in the working position) being advantageously fixed with reference to the yoke whereas the upper roller is journaled in bearings movable along the arms, preferably in longitudinal channels thereof.

The common power train may include an overload-relieving clutch designed to arrest the roller drive if either or both pairs of conditioning rollers should jam.

BRIEF DESCRIPTION OF THE DRAWING

The above and other features of our invention will now be described in detail with reference to the accompanying drawing in which.

SPECIFIC DESCRIPTION

Figure 2:
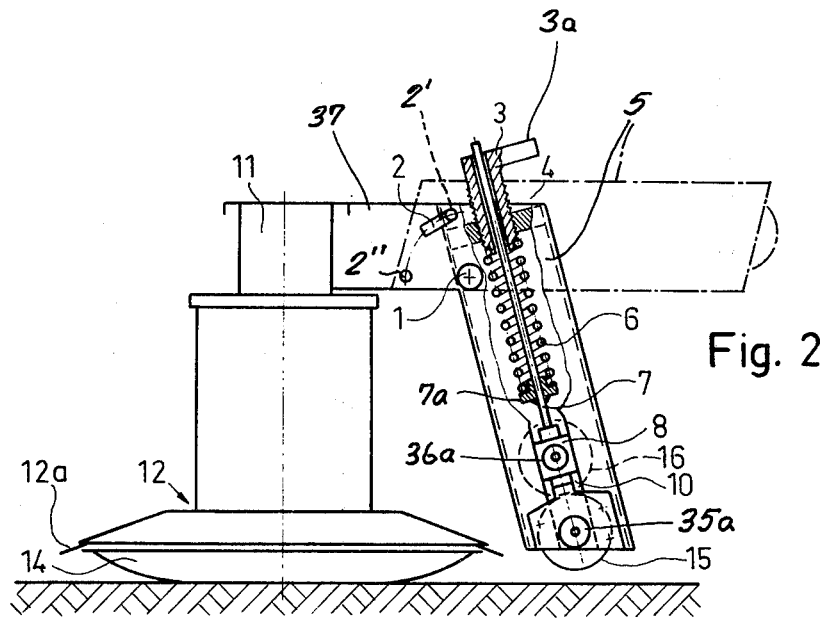
FIG. 2 is a side-elevational view, partly in section, of the assembly of FIG. 1.

In the drawing we have shown a frame 11 for a mower generally similar to that disclosed in commonly owned U.S. Pat. No. 3,772,865, with a wheel base and a tow bar not illustrated here. Frame 11 carries at least two pairs 12, 13 of counterrotating cutting disks 12a, 12b and 13a, 13b with bases 14 resting on the ground in their working position. Though the axes of these disks are shown to be vertical, it will be understood that they could also be slightly tilted, e.g. as illustrated in U.S. Pat. No. 3,626,284.

Figure 1:
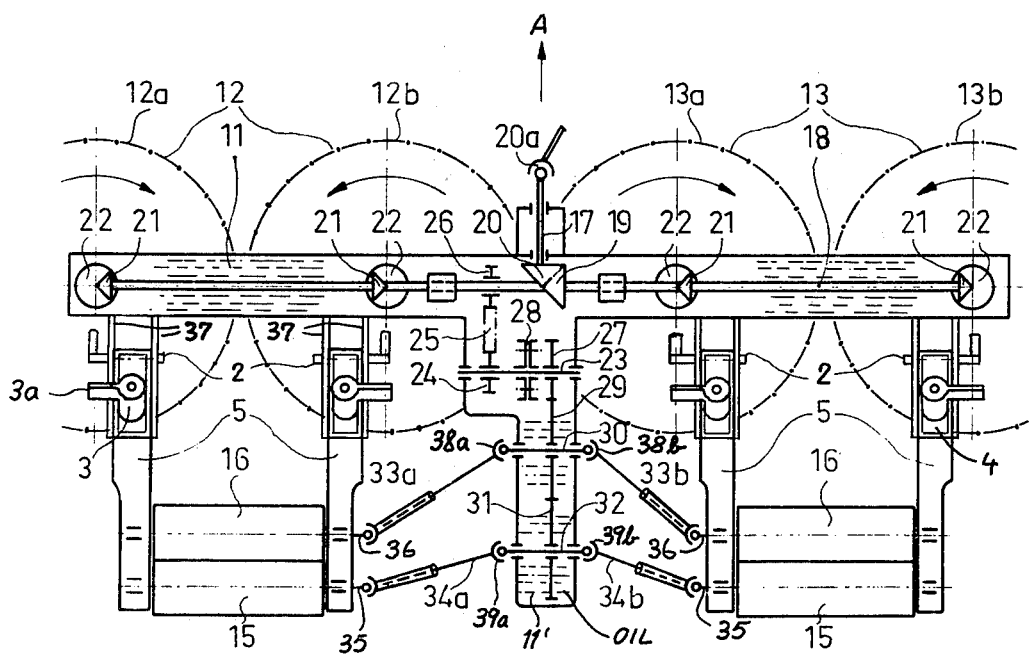
FIG. 1 is a somewhat diagrammatical top view of a representative part of a mower embodying our invention.

Frame 11, extending perpendicularly to the direction of travel represented in FIG. 1 by an arrow A, is a hollow beam forming a receptacle for an oil bath in which a drive mechanism for the disks 12, 13 is immersed as diagrammatically indicated in FIG. 1. That mechanism comprises a main shaft 18 coupled via a pair of bevel gears 19, 20 with an input shaft 17 which is driven from a non-illustrated power-takeoff shaft of the tractor by way of a universal joint 20a. Shaft 18 carries a set of bevel gears 21 meshing with bevel gears 22 on the shafts of the several disks, the gears being so oriented that disk 12a, 12b and 13a, 13b counterrotate and move rearwardly along their confronting edges so that the stalks cut by their radially extending blades are propelled toward the back of the machine along the midplane of each disk pair 12, 13. These stalks are intercepted by respective pairs of horizontal conditioning rollers 15, 16 disposed in the wake of the disks, each roller pair being journaled in two lateral arms 5 forming a yoke with the shaft 35 of the lower roller 15 whose bearings 35a are fixedly positioned in these arms. The shaft 36 of the upper roller 16 has bearings 36a mounted in blocks 8 which are slidable in longitudinal channels 10 of the respective arms. Each block 8 is rigid with a stem 7 having a shoulder 7a, the free end of the stem 7 passing through a hollow spindle 3 which is matingly received in a nut 4 fixed to arm 5; a compression spring 6, inserted between spindle 3 and shoulder 7a, urges the roller 16 against roller 15 with a contact pressure which can be adjusted by rotating the spindle 3 in its nut 4 with the aid of a handle 3a. Another handle 2 at the top of each arm is integral with a pin which can be fitted into either of two holes 2' and 2" on a pair of brackets 37 rigid with frame 11 to which the arm 5 is pivoted by a pin 1, thereby enabling the yoke to be locked in a working position or in a substantially horizontal retracted position respectively indicated by full lines and by phantom lines in FIG. 2.

In the working position, in which the yoke arms 5 are inclined at a small angle to the vertical, conditioning rollers 15 and 16 gather and press the oncoming crop material in essentially the manner described in U.S. Pat. No. 3,656,284. The rollers may be provided, for this purpose, with helicoidal ribs serving to direct the stalks toward the midplane of the associated disk pair.

A sprocket 26 keyed to shaft 18 is linked by a chain 25 with a sprocket 24 on a secondary shaft 23 which is parallel to shaft 18 and carries an idler gear 27. A friction clutch 28, serving as a protection against overload, couples the gear 27 with shaft 23 whereby two ancillary shafts 30, 32 parallel to shaft 18 are driven via two further gears 29 and 31. Shafts 23, 30 and 32 with their associated gears are disposed in an extension 11' of frame 11 which is also filled with oil for the purpose of lubrication.

The ends of ancillary shafts 30 and 32, projecting through suitable oil seals from the receptacle formed by frame extension 11', carry universal joints 38a, 38b and 39a, 39b by which they are coupled with respective sections of two telescoped and therefore extensible shafts 33a, 33b whose complementary sections are coupled by similar universal joints with roller shafts 36 and 35. Thus, each ancillary shaft simultaneously drives two conditioning rollers journaled in respective pairs of supporting arms 5 on opposite sides of frame extensions 11'.

The extensibility of shafts 33a, 33b and 34a, 34b allows either or both pairs of conditioning rollers 15, 16 to be retracted from their working position, as when the associated disk pair 12 or 13 is deactivated through a nonillustrated coupling.

Universally jointed transmission shafts 33a, 33b, 34a, 34b do not exert any significant transverse force upon the conditioning rollers 15, 16 driven thereby whose contact pressure therefore depends exclusively on the setting of adjusting handles 3a. It will be apparent that the provision of two such handles for each adjustable roller 16 facilitates the positioning of that roller parallel to its companion roller 15.

We claim:

1. A mower comprising:

a wheel frame adapted to be towed by a tractor, said frame being generally transverse to the direction of travel;

two pairs of cutting disks mounted in a row on said frame for counterrotation about generally vertical axes to mow a crop to be harvested, said frame having a rearward extension lying between said pairs of cutting disks;

drive means on said frame operatively coupled with said cutting disks;

two supports on said frame each extending rearwardly of a respective pair of cutting disks;

a pair of coacting horizontal conditioning rollers on each of said supports disposed in the wake of the respective pair of cutting disks for gathering and pressing the freshly mown crop; and transmission means operatively connecting said rollers with said drive means, said transmission means including two ancillary shafts on said extension each linked via two universally jointed shafts with two of said rollers respectively carried on said supports.

2. A mower as defined in claim 1 wherein each of said supports is provided with a pivotal mounting on said frame enabling independent swinging of the support for elevating said rollers from a working position into a retracted position remote from the level of said cutting disks, said universally jointed shafts being extensible to facilitate such swinging.

3. A mower as defined in claim 2 wherein each of said supports is provided with locking means for selectively retaining said rollers in said working position and in said retracted position.

4. A mower as defined in claim 1 wherein each of said supports comprises a yoke with a pair of lateral arms, said rollers being respectively provided with a lower shaft and an upper shaft journaled in said arms.

5. A mower as defined in claim 4 wherein said lower shaft is provided with fixed journal bearings and said upper shaft is provided with movable journal bearings, each of said supports being provided with control means linked with said movable journal bearings for adjusting the contact pressure between said rollers.

6. A mower as defined in claim 5 wherein said arms are provided with longitudinal channels, said movable journal bearings being slidable in said channels.

7. A mower as defined in claim 6 wherein said control means comprises a nut fixedly secured to each of said arms, a hollow spindle matingly received in said nut, a stem rigid with a respective movable journal bearing traversing said hollow spindle, said stem being provided with an abutment, and a compression spring between said hollow spindle and said abutment.

8. A mower as defined in claim 1 wherein said transmission means further comprises an overload-relieving clutch inserted between said drive means and said ancillary shafts.

9. A mower as defined in claim 1 wherein said frame and said extension form a receptacle for an oil bath lubricating said drive means and said transmission means.

* * * * *